Patented May 1, 1945

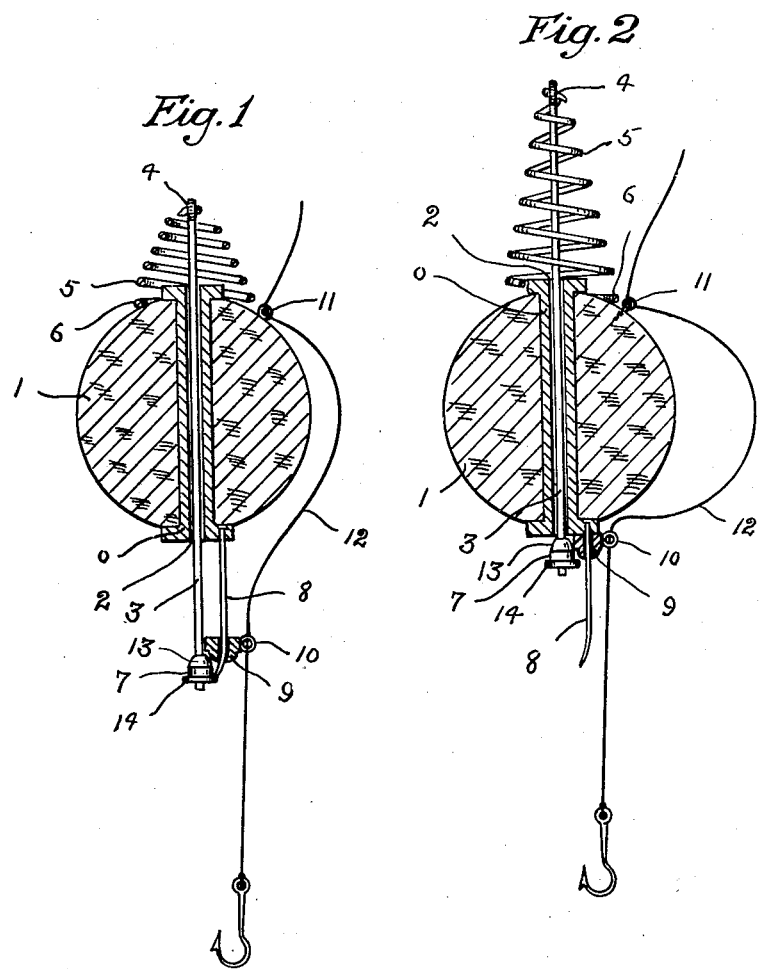

2,374,752

UNITED STATES PATENT OFFICE 2,374,752

HOOKING BOB

Gustav W. Johnson, Chippewa Falls, Wis.

Application February 4, 1944, Serial No. 521,111

3 Claims. (Cl. 43—15)

This invention relates to fishing bobs and has special reference to that type of bob equipped with automatic means for suddenly jerking upwardly that portion of the line carrying the fish hook and suspended in the water below the bob, the action of which is for the purpose of snagging or hooking a fish while nibbling at the bait on the hook.

However, the instant invention resides in a novel form of tripping arrangement for holding and releasing the mechanism to effect the automatic action of the bob.

The principal objects sought are dependability in action of the device and simplicity of construction.

Other objects and advantages of the specific construction may appear in the further description of the invention.

Referring now to the drawing forming part of this application and in which like reference characters represent like parts:

Fig. 1 is a central transverse sectional view of one of the improved bobs having the novel form of trigger and cooperative parts attached and in set position; and Fig. 2 is a like view except that the cooperative parts are in sprung position, and Fig. 3 is an enlarged perspective view of the line holding spring coil.

In the drawing 1 represents the bob proper which may be of any desired shape and material, but which are usually somewhat spherical in form and of cork or like light material.

An axial hole as indicated at 2 is formed through the body portion 1 and may or may not be metallically bushed as suggested at 0.

The reciprocable spindle 3 is installed within the hole 2 with its uppermost end extending normally some little distance above the bob and attached as at 4 to the uppermost coil of the conically shaped helical expansive spring 5, the largest or base coil 6 of which bears at all times upon the upper surface of the bob.

The lowermost end of the spindle 3 also extends materially below the surface of the bob and has fixed thereto the cylindrically shaped member 7 having a circularly shaped flange-like projection about the lower end thereof as at 14 and a cone shaped opposite or upper end 13.

Spaced from the spindle and fixed to the bob is the wire like depending trigger 8 and between the extreme lower end of which and the lower face of the bob is loosely carried thereupon the tripping bead which has an arcuately shaped conical lower portion 9 for engagement with the similar, though inverted, portion 13 of the member 7.

Upon one side of the cylindrical upper portion of the tripping bead is fixed a small pinching helical spring coil 10 in which the hook-equipped end of the fish line 12 may be attached and depend to any desired length therefrom as is obvious.

The depending trigger 8 is bent inwardly at its lower end to normally rest in line or practically so with the innermost edge of the upper face of the flange 14. This is to insure at any time when the spindle 3 is in its fully downwardly extended position that the end of the trigger 8 will be engaged upon the upper face of the flange 14 and by which engagement the spindle is securely held in its extended position after being once so set ready for action. In this set position the tripping bead will naturally remain as low as possible with its conical lower surface 9 resting idly against the upper arcuately shaped end of the member 7.

However, should a fish for example while nibbling at the bait on the hook at the end of the line pull downwardly sufficiently hard to cause the tripping bead 9 to crowd the end of the trigger 8 off from the flange 14, the expansive spring 5 will instantly function to jerk upwardly on the suspended hook and possibly snag the fish which might insure a successful catch, and help to reduce the annoying percentage of those big ones that so invariably get away.

Having thus described one embodiment of my invention, what I claim and wish to secure by Letters Patent is:

1. In a hooking bob of the type described having a reciprocable spring actuated spindle therethrough, said spindle extending normally well below said bob; a relatively stiff trigger fixed to said bob, and extending downwardly approximately parallel with said spindle a washer-like member fixed to said spindle and adjacent the lowermost end thereof for reception of the lowermost end of said trigger, a tripping bead loosely carried upon said spindle intermediate of said washer and the lower surface of said bob, and a fish line holding means carried by said bead whereby, when sufficient downward stress upon said line occurs to cause the tripping bead to crowd the end of said trigger off from said washer the spring active force of said spindle may act to jerk the fish hook upwardly.

2. Trigger operating means for an automatically operable hooking bob having a spring operated spindle therethrough extending well below said bob; a wire-like trigger fixed to said bob, spaced from said spindle and extending downwardly substantially parallel with said spindle, a washer-like stop flange fixed to and adjacent the extreme lowermost end of said spindle for normal holding engagement of said trigger, and a fish line carrying tripping bead slidably carried upon said trigger intermediate of said flange and bob, whereby when an abnormal pull downwardly upon said line will cause said bead to force the free end of said trigger off from said washer said spindle will be permitted to jump upwardly by the action of its spring and thus produce the desired hooking action upon said fish line.

3. Trigger operating means for an automatically operable hooking bob of the character described having a spring operated spindle therethrough extending well below said bob; comprising in cooperative combination, a washer like flange fixed to and adjacent the lowermost end of said spindle, a depending spring-like trigger carried by said bob and extending substantially parallel with said spindle and with its lowermost otherwise free end normally resting upon said flange, to hold said spindle in its fully extended position and a fish line carrying tripping bead slidably carried upon said spindle intermediate of said flange and said bob, whereby when abnormal downward stress occurs upon said line said bead will crowd the free end of said trigger off from said flange and thus permit the upward spring action of the spindle to occur producing the desired upward hooking action upon the fishing line.

GUSTAV W. JOHNSON.